(12) United States Patent
Sparre

(10) Patent No.: US 8,219,703 B2
(45) Date of Patent: Jul. 10, 2012

(54) METHOD FOR SHARING INFORMATION BETWEEN HANDHELD COMMUNICATION DEVICES AND HANDHELD COMMUNICATION DEVICE THEREFORE

(75) Inventor: Erik Sparre, Lomma (SE)

(73) Assignee: Sony Mobile Communications AB, Lund (SE)

( * ) Notice: Subject to any disclaimer, the term of this patent is extended or adjusted under 35 U.S.C. 154(b) by 1260 days.

(21) Appl. No.: 11/908,649

(22) PCT Filed: Feb. 9, 2006

(86) PCT No.: PCT/EP2006/001162
§ 371 (c)(1),
(2), (4) Date: Sep. 14, 2007

(87) PCT Pub. No.: WO2006/102950
PCT Pub. Date: Oct. 5, 2006

(65) Prior Publication Data
US 2008/0096603 A1  Apr. 24, 2008

Related U.S. Application Data

(60) Provisional application No. 60/670,337, filed on Apr. 12, 2005.

(30) Foreign Application Priority Data

Mar. 29, 2005  (EP) ..................................... 05006756

(51) Int. Cl.
*G06F 15/16* (2006.01)
*G06Q 40/00* (2006.01)
*H04L 12/26* (2006.01)
*H04B 7/208* (2006.01)
*G06F 3/12* (2006.01)
*H04B 1/38* (2006.01)
*G06F 3/00* (2006.01)

(52) U.S. Cl. .......... 709/232; 705/40; 370/252; 370/344; 709/204; 709/227; 709/217; 358/1.15

(58) Field of Classification Search ................. 709/217, 709/227, 232, 204; 715/700; 455/73; 705/40; 370/252, 344; 358/1.15
See application file for complete search history.

(56) References Cited

U.S. PATENT DOCUMENTS
6,763,226 B1  7/2004 McZeal, Jr.
(Continued)

FOREIGN PATENT DOCUMENTS
WO  WO 2005/001857 A1 * 8/2004
(Continued)

OTHER PUBLICATIONS
International Search Report for corresponding Application No. PCT/EP2006/001162 mailed Apr. 24, 2006.

*Primary Examiner* — David Lazaro
*Assistant Examiner* — Vitali Korobov
(74) *Attorney, Agent, or Firm* — Renner, Otto, Boisselle & Sklar, LLP

(57) ABSTRACT

The present invention relates to a method and an electronic equipment for a communication system enabling information sharing, wherein desired information contents are transmitted by few user operations. Electronic equipment comprises a information processing means (16) for processing information according to the operation of the user, a detecting means (15) for detecting the information sharing command, an information content determining means (S2) for determining information content to be transmitted by detecting the current user action, a determine S2 recipient determining means (S3) for determining the recipient of said information content; and content to be transmitting means (S5) for transmitting said information content to the determined recipient via transmitted a communication link.

18 Claims, 5 Drawing Sheets

U.S. PATENT DOCUMENTS

| | | | |
|---|---|---|---|
| 7,139,797 B1* | 11/2006 | Yoakum et al. | 709/204 |
| 7,643,463 B1* | 1/2010 | Linsky et al. | 370/344 |
| 2002/0001100 A1* | 1/2002 | Kawanabe | 358/1.15 |
| 2003/0187794 A1* | 10/2003 | Irwin et al. | 705/40 |
| 2005/0018050 A1 | 1/2005 | Yaji et al. | |
| 2005/0246738 A1* | 11/2005 | Lockett et al. | 725/43 |
| 2006/0056309 A1* | 3/2006 | Maaniitty | 370/252 |

FOREIGN PATENT DOCUMENTS

| | | |
|---|---|---|
| WO | 2005/018257 | 2/2005 |

* cited by examiner

METHOD FOR SHARING INFORMATION BETWEEN HANDHELD COMMUNICATION DEVICES AND HANDHELD COMMUNICATION DEVICE THEREFORE

This application is a §371 of International Application No. PCT/EP2006/001162 filed on Feb. 9, 2006, which claims benefit to U.S. Provisional Application No. 60/670,337 filed on Apr. 12, 2005, and also claims priority to European Application No. 05006756.0 filed on Mar. 29, 2005.

TECHNICAL FIELD OF THE INVENTION

The present invention relates to a method and an electronic equipment for a communication system enabling information sharing. In particular, it relates to a mechanism for transmitting desired information contents by few user operations in handheld communication devices.

DESCRIPTION OF RELATED ART

At present, most handheld devices for a wireless communication system, such as mobile telephones, pagers, personal digital assistants or electronic organizers etc. enable the user to send various types of information contents i.e. voice, text, images, videos, sound, drawings, sketches and documents to another person. Depending on information type, the content is transmitted, for example, via SMS (Short Message Service), MMS (Multimedia Message Service), video conference or email. Thereby, the communication can be based on a communication protocol, such as the Bluetooth™, the WLAN (Wireless Local Area Network), the UMTS (Universal Mobile Telecommunication Systems), or the GSM (Global Systems for Mobile communication) protocol.

Many of the handheld devices also have the ability to synchronize with a desktop computer, utilizing either a synchronizer connected to the desktop computer or some sort of wireless protocol. Mini-web browsers allow users of the handheld devices with online connection capability to roam the Internet and extract information from the Internet.

Portable communication devices nowadays have to be small, and nevertheless functional, wherein functions shall be activated with only few operations because it is important for many customers to have a small device with easy to access functionabilities.

For reducing user operations, it is known to offer a menu of functions corresponding to a specific current application. For example, when a photo was made by the built-in camera of a mobile telephone, a function of sending the present image via MMS is offered automatically. Further, mobile telephones having a "Walkie-Talkie" function called Push to Talk (PTT) are known, wherein, with the touch of the PTT key of the mobile telephone, a communication with a predetermined group of communication devices is established automatically. However, there is no general "one-key"-function for sharing information contents from any running application with another user.

SUMMARY

It is an object of the present invention to provide an electronic equipment for a communication system and a method for an electronic equipment which enable to transmit desired information contents by few user operations.

This object is achieved by an electronic equipment for a communication system and a method for an electronic equipment according to the enclosed independent claims. Advantageous features of the present invention are defined in the corresponding subclaims.

According to the present invention the electronic equipment for a communication system enabling information sharing comprises an information processing means for processing information according to the operation of the user, a detecting means for detecting an information sharing command, an information content determining means for determining information content to be transmitted by detecting the current user action, a recipient determining means for determining the recipient of the information content and a transmitting means for transmitting the information content to the determined recipient via a communication link.

Thus, the present invention provides a new universal information sharing function for each application independent of information type processed by the electronic equipment, wherein information contents of a current application processed by the electronic equipment can be transmitted by few user operations. The sharing function can be achieved by, for example, pressing a predetermined key of the handheld communication device, a so called "share it" key that can be a hard or soft key, a menu function, or via voice control. In particular, if during an application the user just wants to share, for example, the camera viewfinder, an actually reproduced music or video clip, an Internet page, or a displayed photo, only a predetermined key of the device has to be pressed or a predetermined (key)word has to be spoken for triggering the sharing process, wherein the desired information content of the application for transmitting is determined automatically.

According to a preferred embodiment of the present invention the electronic equipment is adapted to transmit information contents by a plurality of transmission methods, wherein the electronic equipment further comprises a transmission method determining means for determining the transmission method by which the determined information content has to be transmitted by the transmitting means. It should be noted that "transmission" also includes, for example, "initiate session" like PTT or video call.

Preferably the transmission method determining means is adapted to determine the transmission method based on the information content to be transmitted and/or the ongoing communication, wherein, for example, the system will be have rules for different standard content formats, e.g. a text shown on the display would always be shared in a particular format, a picture in another format, a sound in a third, etc.

Advantageously the electronic equipment further comprises a storage means for storing recipient data indicating, with respect to each previous communication, recipient address, transmission method and type of the transmitted information content, wherein the recipient determining means is adapted to determine the recipient of the information content based on the recipient data stored in the storage means and/or the transmission method determining means is adapted to determine the transmission method based on the recipient data stored in the storage means.

Further, advantageously the electronic equipment further comprises means for generating a priority list of recipients and/or transmission methods based on the recipient data stored in said storage means. The priority list is displayed on a display for user selection. As an advantageous additional feature, before the content is transmitted, the determined information content, the determined recipient and/or the determined transmission method is displayed on a display (together or after each other) for the confirmation by the user.

According to a further preferred embodiment of the present invention the electronic equipment is adapted to transmit the information content via the communication link of an ongoing communication, wherein the electronic equipment further comprises mixing means for interleaving the information contents with the signal of the ongoing communication. Thereby, it is possible to keep up the communication and at the same time transmit the information content in order to share and discuss the information content in real-time.

Preferably the communication system is a wireless communication system, wherein the electronic equipment is a mobile phone. However, it should be noted that the electronic equipment can be any kind of handheld communication device like as pagers, personal digital assistants, handset or electronic organizers etc.

It should be emphasised that the term "comprises/comprising" when used in the specification is taken to specify the presence of stated features, integers, steps or components but does not preclude the presence or edition of one or more other features, integers, steps, components or groups thereof.

In context of the present application and the present invention, the term "electronic equipment for a wireless communication system" includes any kind of portable radio communication equipment. The term "portable radio communication equipment" includes all equipment's such as mobile telephones, mobile cell-phones, pagers, personal digital assistants, communicators, i.e. electronic organisers, smart phones or the like. The term "wireless communication system" relates to any kind of communication or telecommunication system which enables the wireless transfer of information.

BRIEF DESCRIPTION OF THE DRAWINGS

Embodiments of the invention will now be described by way of example only with reference to the accompanying drawings, in which.

DETAILED DESCRIPTION OF EMBODIMENT

Figure 1:
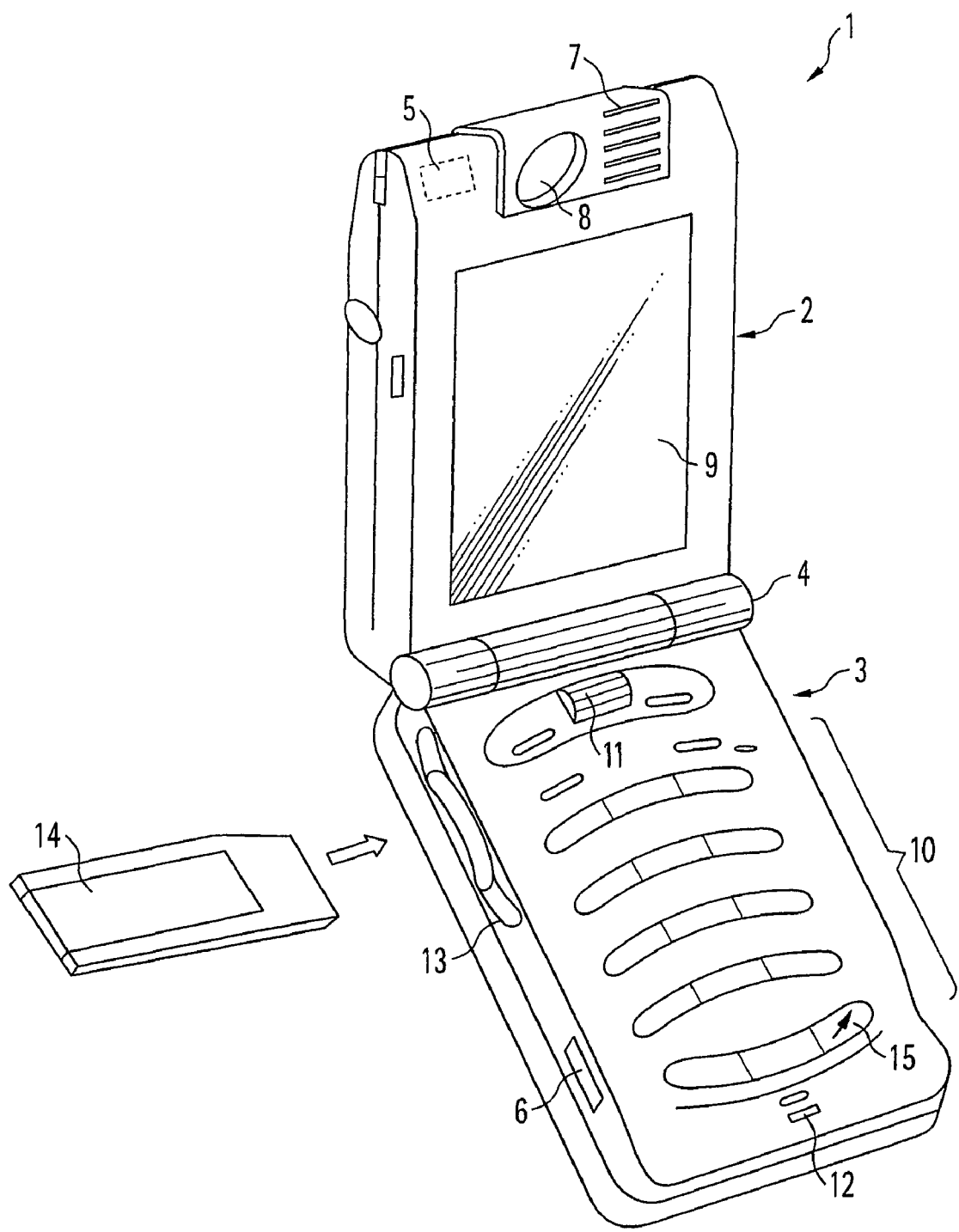
FIG. 1 shows schematically a mobile phone according to a first embodiment of the present invention.

FIG. 1 shows schematically an embodiment of a mobile phone according to the present invention. As shown in FIG. 1, the mobile terminal 1 comprises a first part 2 and a second part 3 connected by a hinge 4 interposed therebetween. Communications are exchanged wirelessly with a base station or other devices (not shown) via the antenna 5 or via the Bluetooth™ interface 6. A speaker 7 and a digital camera 8 are installed above the display 9 in the first part 2. The second part 3 includes operation keys 10 including a "share-it" key 15, and a jog dial 11, a microphone 12, a memory stick slot 13 that accommodates a removable Memory Stick (trademark) 14. The Memory Stick 14 is made up of flash memory elements constituting a nonvolatile memory EEPROM (Electrically Erasable and Programmable Read Only Memory) housed in a small, thin plastic case. A 10-pin plug allows various kinds of data such as pictures, voice and sounds to be written to and read from the inserted Memory Stick. A battery pack (not shown) is attached to the back of the first part 1. In the shown embodiment, the "share-it" function is fixedly allocated to a specific key, in contrary to a "soft key" functionality as described in relation to FIG. 4. Further, it is to be noted that the clam-shell type phone shown in FIG. 1 is only an example and that any type of mobile terminal can be used with the fixed "share-it" key.

Figure 2:
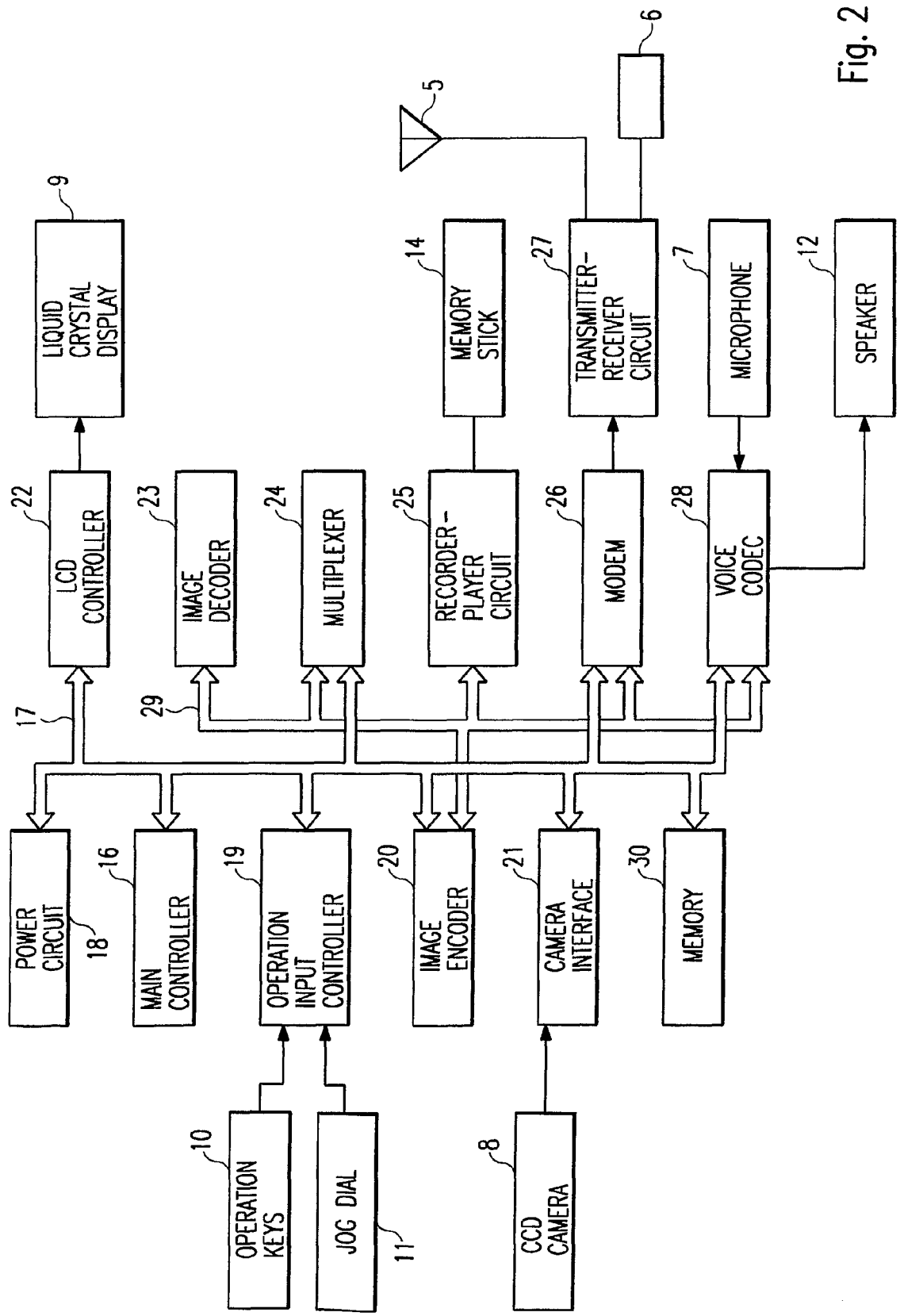
FIG. 2 shows a block diagram illustrating schematically the elements of the mobile phone shown in FIG. 1.

FIG. 2 is a block diagram showing an internal structure of the mobile phone 1 shown in FIG. 1. As shown in FIG. 2, the mobile phone 1 includes a main controller 16 connected via a main bus 17 with a power circuit 18, an operation input controller 19, an image encoder 20, a camera interface 21, an LCD (Liquid Crystal Display) controller 22, an image decoder 23, a multiplexer 24, a recorder/player circuit 25 which receives the Memory Stick 14, a modem 26 connected to a transmitter/receiver circuit 27, a voice codec 28 connected to the microphone 12 and the speaker 7 and a nonvolatile memory 30 for storing history data with respect to any previous communication/transmission. The image encoder 20, the image decoder 23, the multiplexer 24, the modem 26, the voice codec 28 and a recorder-player circuit 25 are interconnected by way of a synchronous bus 29.

In a voice call mode, a voice signal picked up by the microphone 12 is converted by the voice codec 28 into digital audio data under control of the main controller 16 constituted by a CPU (Central Processing Unit), a ROM (Read Only Memory) and a RAM (Random Access Memory). The digital audio data are subjected to spread-spectrum encoding by the modem 26 before undergoing digital-analog conversion and frequency conversion by the transmitter/receiver circuit 27. After the conversion, the data are transmitted via the antenna 5. A received signal captured by the antenna 5 is amplified and subjected to frequency conversion and analog-digital conversion. The signal thus converted is subjected to spread-spectrum decoding by the modem 26. The signal thus processed is converted to an analog voice signal by the voice codec 28 before being output by the speaker 7.

Electronic mail is transmitted in a data communication mode, wherein text data of the mail are first entered by manipulating the operation keys 10 and jog dial 11. The text data are fed to the main controller 16 via the operation input controller 19. The main controller 16 subjects the text data to spread-spectrum encoding by the modem 26 prior to digital-analog conversion and frequency conversion by the transmitter/receiver circuit 27. The data thus converted are transmitted via the antenna 5 or the Bluetooth™ interface 6.

Image data are transmitted in a data communication mode, wherein image data picked up by the camera 8 are supplied to the image encoder 20 via the camera interface 21. The image encoder 20 converts the image data from the camera 8 into coded image data through suitable compression coding such as that of MPEG (Moving Picture Experts Group) 2 or MPEG4. The image data thus coded are output to the multiplexer 24. When image data are picked up by the camera 8, they may be directly displayed on the liquid crystal display 9 via the camera interface 21 and LCD controller 22.

Any voice picked up by the microphone 12 during picture-taking by the camera 8 is sent as digital audio data to the multiplexer 24 via the voice codec 28. The multiplexer 24 multiplexes the coded image data from the image encoder 20 and the audio data from the voice codec 28 in accordance with a specific method. The resulting multiplexed data are subjected to spread-spectrum coding by the modem 26 before undergoing digital-analog conversion and frequency conversion by the transmitter-receiver circuit 27. The data thus converted are transmitted via the antenna 5.

Also in the data communication mode, data representing a moving picture are transmitted and received, wherein moving picture data picked up by the camera 8 or moving picture data contained in the moving picture file derived from the simple-format website are supplied through the LCD controller 22 to the liquid crystal display 9 for playback.

In addition to the transmission of information, with the mobile phone 1, the user can play back audio and video signals recorded on the Memory Stick 14, record video signals supplied from the camera 8 and roam the Internet via a Mini-web browser (not shown), execute various programs for word processing, address administration etc., wherein the user issues various commands for controlling the above processes and applications by manipulating the operation keys 10 and the jog dial 11.

Figure 3:
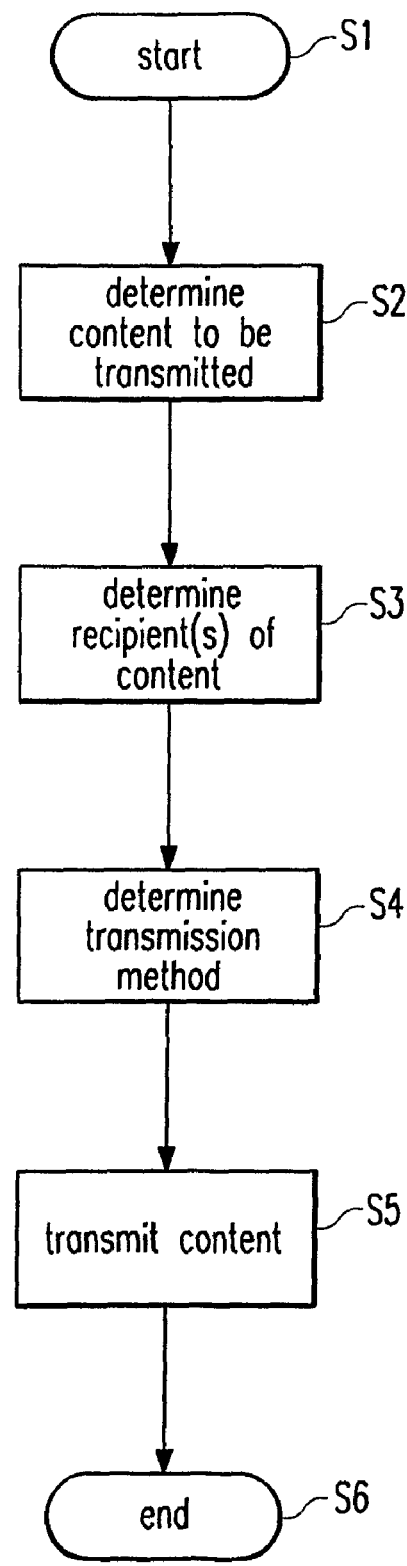
FIG. 3 shows a flow chart illustrating schematically the process steps of the information sharing method according to the present invention.

By pressing the "share-it" key 15 during any application the user initiates the sharing process according to the present invention. As shown in FIG. 3, after the sharing process is started in step S1 by pressing the "share-it" key 15, in step S2 the main controller 16 determines the information content to be transmitted by detecting the applications in process and the current user action. For example, if a video recorded on the Memory Stick 14 is played back, this video signal is determined, if the camera 8 is activated, the image data picked up by the camera 8 is determined, if the internal telephone book or calendar is visited, the displayed entry is determined, if a game is activated, the game information is determined. For the exact determination, it could be advantageous to determine, in addition to the current user action, the user action(s) before and/or after the sharing process is initiated.

In step S3 the main controller 16 determines the recipient(s) of information content based on the type of the determined information content and the history data stored in the memory 30, wherein the history data contain transmission date, recipient address (email-address, telephone number etc.), transmission method (PTT, SMS, MMS, IM, 3G, Bluetooth™/IrDa etc.) and type of the transmitted information content of each previous communication. For example, if the game information is determined in step S2, the main controller 16 judges, based on the history data, whether the same game was played with other parties in a previous session and, if so, the members of the previous game are determined as recipients of the game information.

In step S4 the main controller 16 determines, based on the type of the information content determined in step S2 and the history data stored in the memory 29, the transmission method by which the information content has to be transmitted. For example, if an image information is determined in step S2 and image information was transmitted to the recipient determined in step 3 via MMS in a previous transmission, the Multimedia Message Service (MMS) is determined as transmission method. After the information content is transmitted to the recipient(s) by the transmitter/receiver circuit 27 in step S5, the sharing process ends in step 6.

It is to be noted that the steps S2, S3 and S4 can be implemented in any kind of suitable hardware and/or software structure. For example, the steps of determining the information content, determining the recipient and/or determining the transmission method could be implemented as a computer programme product directly loadable into an internal memory of a communication device.

As an advantageous additional feature, before the content is transmitted, the determined information content, the determined recipient and/or the determined transmission method is displayed on the display 9 (together or after each other) for the confirmation by the user by re-pressing the "share-it" key 15 or any other confirmation key.

In the case, where the content, the recipient(s) and/or the transmission method can not be determined in steps S2, S3 and S4, respectively, the user is asked for via entry menu displayed on the display 9 (not shown). In particular, if the "share-it" key 15 is pressed during browsing the Internet, in the menu, for example, the user has to select whether the web-page displayed on the or the URL shall be sent, wherein the user selections are recorded for learning. Further, the main controller 16 can generate a priority list of recipients and/or transmission methods based on the recipient data stored in the memory 30 for user selection.

According to the present invention, during a communication the user can share/transmit information to the person he is in communication with. For example, if a video is played back during a voice or video call and the user presses the "share-it" key 15, the video signal played back is determined as information content to be transmitted in step S2. In step S3, the main controller 16 judges whether there is an ongoing communication and, if so, the person or group the user is in communication is determined as recipient of the video signal. It should be noted that the recipient also can be a machine, e.g. a web-server (life blog). The video signal is encoded by the image encoder 20 and mixed with the signal of the ongoing communication by the multiplexer 24.

As an advantageous additional feature, for transmitting the video signal, the mobile phone 1 can switch between a voice call and video conference mode.

With the present invention, during a communication, the user can spontaneously select content and transmit the selected content to the person he is in communication. This solution gives the user the possibility to talk and at the same time transmit the information content in order to share and discuss the information content in real-time, or near realtime as is the case with SMS, MMS, email.

Figure 4:
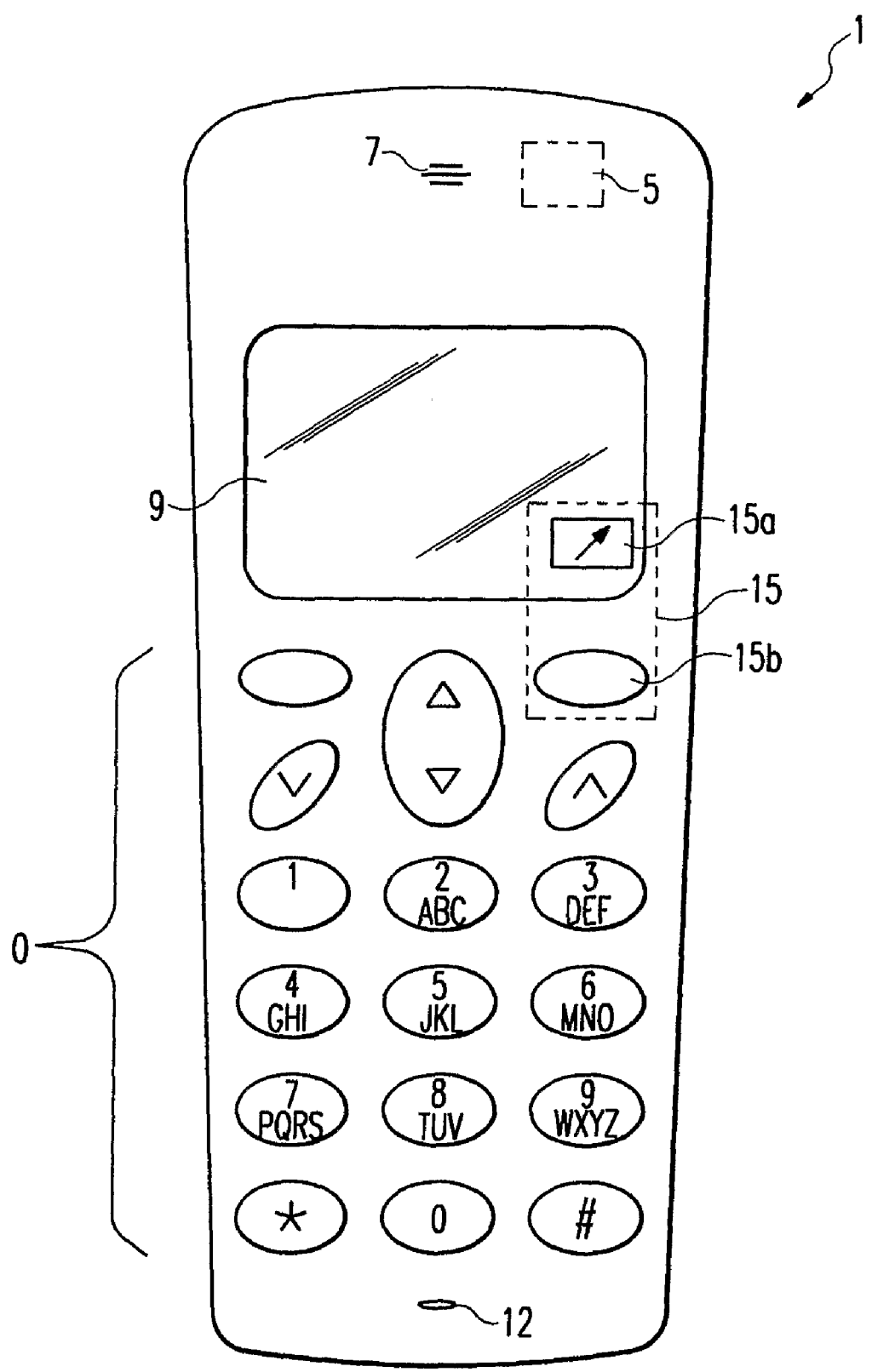
FIG. 4 shows schematically a mobile phone according to a second embodiment of the present invention.

FIG. 4 shows a mobile phone 1 according to a further embodiment of the present invention. The mobile phone 1 according to the further embodiment of the present invention has a one-part system-unit cover. The mobile phone shown in FIG. 4 comprises an antenna 5, a speaker 7, a display 9, operation keys 10, and a microphone 12. As shown in FIG. 4, the sharing function can be activated (and the "share-it" key is realised) by a so called "soft key" 15, wherein the user presses the key 15*b* positioned under the "share it" icon 15*a* displayed on the display 9. Note that the position of the "share it" icon 15 on the screen/display 9 has not to be fixed. Generally, a plurality of soft keys are located on the soft key bar at the bottom of the screen/display 9, and the position of the "share it" icon 15 on the screen indicates the key of the soft key bar that has to be pressed to start the sharing function. It is to be noted that the one-part phone as shown in FIG. 4 is only an example and that any kind of mobile terminal can be used with the "share-it" soft key functionality.

Figure 5:
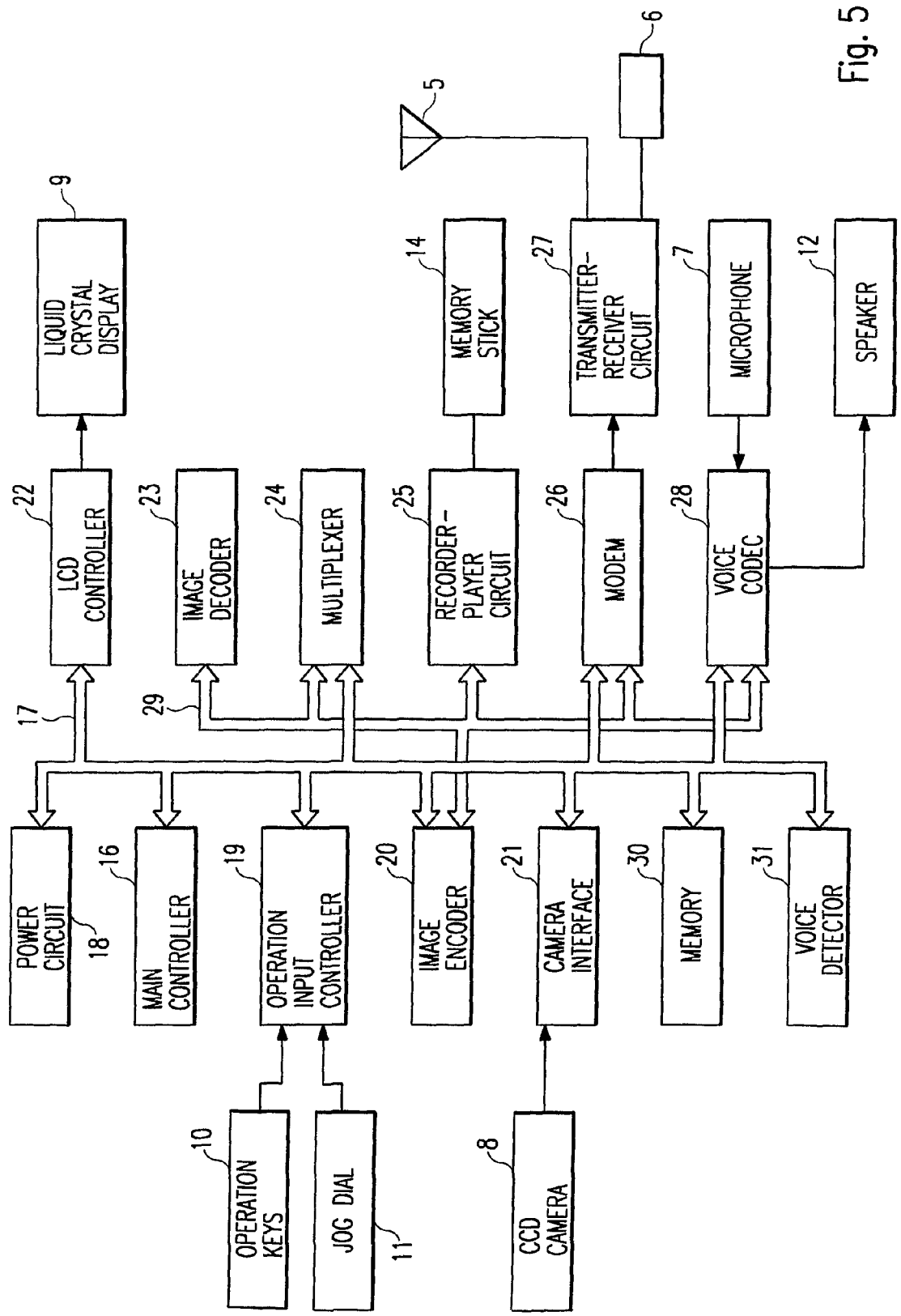
FIG. 5 shows a block diagram illustrating schematically the elements of a mobile phone according to a third embodiment of the present invention

FIG. 5 shows a block diagram illustrating schematically the elements of a mobile phone according to a third embodiment of the present invention. In the arrangement shown in FIG. 5, the same elements as those described above with reference to FIG. 2 are indicated by the same reference numerals and thus, their descriptions are omitted. According to the third embodiment, the sharing function can be activated by a voice command of the user. As shown in FIG. 5, the mobile phone further comprises a voice detector 31 connected via the main bus 17 with the voice codec 28 and the main controller 18. When the main controller 18 detects any user activation, the main controller 18 activates the microphone 7, the voice codec 28 and the voice detector 31, wherein the voice detector 31 detects the digital audio data received from the voice codec 28 and sends a signal for starting the sharing process to the main controller 18 via the main bus 17, if a predetermined key word/voice command (e.g. "share it") is detected. It should be noted that, according to a fourth embodiment of the present invention, the key word/voice command function of the third embodiment can be added to the first and second embodiment of the present invention above. In this case, the sharing function can be activated by a voice command of the user as well as by pressing the "share-it" key 15.

Further, according to a fifth embodiment of the present invention, the sharing function can be activated, if, during a call, an external device is connected to the mobile phone or a medium is inserted in the mobile phone. For example, if, during a call, the main controller 18 detects that an external audio/video device is connected to the mobile phone (e.g. via Bluetooth™ interface 6) or that a Memory Stick 14 having recorded thereon audio/video signals is inserted in memory stick slot 13, the main controller 18 starts the sharing process for sharing the audio/video signals reproduced from the device or the Memory Stick 14, wherein the audio/video signals are transmitted (e.g. after user confirmation) to the determined recipient. This embodiment of the present invention can be combined with the embodiments above.

In line with the steps S2, S3 and S4, the system must aid/automate three major parameters of the sharing process:
1. Determine exactly what the user desires to share, e.g. is it the exact content of the screen, when browsing a web-page, or should the URL be sent?
   According to one preferred method, the system assumes that the user wants to share the information that is contained by the application that has "focus", i.e. control of keypad and display. For example, on user activation, the application shall receive the "share it" signal, and infer what the desired information is. This will make sure that a reasonable semantic behaviour will occur. An application knows something meaningful about the presentation, and can therefore make a good choice.
   In a second method, the system will have rules for different standard content formats. E.g. a text shown on the display would always be shared in a particular format, a picture in another format, a sound in a third, etc.
   In a third method, the user will be prompted to select what information to share. This could mean that the user would have to select from the entire set of available information in the phone, and thus have to browse all information available. A more relevant variant is to combine this method with the first, or second, i.e. the user would be asked to choose between a few alternatives.
2. Determine the address(es) to the receiver(s), e.g. is the receiver implied by the B-party in an ongoing call?
   One preferred method is to ask the user to select the receiver, e.g. via the phonebook.
   Another preferred method is to let the system state imply the receiver, e.g. if a call, video call, PTT session, or IM chat session, is ongoing it would imply receiver(s). In addition, the user could be prompted to confirm or choose from a list of implied receivers.
   The format of the shared data could be used as a parameter in a rule system or equation to determine the most likely receiver, e.g. a PTT session can imply a receiver, but that would only be relevant when sharing sounds.
   History information can be used to present frequent receivers for user selection, since they are more likely to be desired.
   All methods can be combined in a receiver selection algorithm.
3. Determine what the most suitable transmission method is, e.g. is it via a message or via video telephony, etc.
   One method is to base the transmission method entirely on the data format share, e.g. short texts always via SMS, pictures via MMS, etc.
   An alternative method is check the current state of the system. I.e., if a video call is connected, that would be the preferred channel. If instant messaging is available, that would be the second best. The method would be decided based both on format and system state.
   An alternative method is to determine method based on state and/or capability information (e.g. PTT presence) published by the receiver on a networked system.
   An alternative method is to determine method based on previous "experience" with the receiver. E.g., if MMS messages have been received earlier, the system can expect MMS to work and therefore prefer that method.
   All methods above can be used as parameters in a priority equation that would determine the best transmission methods is.

The invention claimed is:

1. Electronic equipment for a communication system enabling information sharing, comprising:
   information processing means for processing information according to an operation of the user;
   detecting means for detecting an information sharing command;
   information content determining means for automatically determining information content to be transmitted in response to the information sharing command being detected by said detecting means, the information content being automatically determined by detecting an application in process and a current user action;
   recipient determining means for determining the recipient of said information content; and
   transmitting means for transmitting said information content to the determined recipient via a communication link
   wherein the electronic equipment is adapted to transmit information contents by a plurality of transmission methods, and
   the electronic equipment further comprises a transmission method determining means for determining the transmission method by which the determined information content has to be transmitted by said transmitting means.

2. Electronic equipment according to claim 1, wherein said transmission method determining means is adapted to determine the transmission method based on the type of the information content to be transmitted and/or an ongoing communication.

3. Electronic equipment according to claim 1, wherein the electronic equipment further comprises a storage means for storing recipient data indicating, with respect to previous communications, recipient addresses, transmission methods and types of the transmitted information content.

4. Electronic equipment according to claim 3, wherein said recipient determining means is adapted determine the recipient of said information content based on the recipient data stored in said storage means.

5. Electronic equipment according to claim 3, wherein said transmission method determining means is adapted to determine the transmission method based on the recipient data stored in said storage means.

6. Electronic equipment according to claim 3, further comprising
   means for generating a priority list of recipients and/or transmission methods based on the recipient data stored in said storage means, wherein said information processing means is adapted to generate, based on said priority list, a menu for user selection and/or confirmation.

7. Electronic equipment according to claim 1, wherein
   the electronic equipment is adapted to transmit the information content via the communication link of an ongoing communication,
   wherein the electronic equipment further comprises mixing means for interleaving the information contents with the signal of the ongoing communication.

8. Electronic equipment according to claim 1, wherein
   said communication system is a wireless communication system and said electronic equipment is a mobile radio terminal.

9. Electronic equipment according to claim 1, wherein
   said communication system is a wireless communication system and said electronic equipment is a mobile phone.

10. A method for an electronic equipment enabling information sharing in a communication system, comprising the steps of:
    detecting the information sharing command;
    in response to detecting the information sharing command, automatically determining information content to be transmitted by detecting an application in process and the current user action;
    determining a recipient of said information content; and
    transmitting said information content to the determined recipient via a communication link
    wherein the electronic equipment is adapted to transmit information contents by a plurality of transmission methods, and the method further comprises
    a transmission method determining step for determining the transmission method by which the determined information content has to be transmitted by said transmitting step.

11. A method according to claim 10, wherein in
    said transmission method determining step the transmission method is determined based on the type of the information content to be transmitted and/or an ongoing communication.

12. A method according to claim 10, further comprising
    a step of generating, with respect to previous communications, a list of recipient data indicating recipient addresses, transmission methods and types of the transmitted information content.

13. A method according to claim 10, wherein
    in said recipient determining step the recipient of said information content is determined based on said list of recipient data.

14. A method according to claim 12, wherein
    in said transmission method determining step the transmission method is determined based on said list of recipient data.

15. A method according to claim 12, further comprising the steps of:
    generating a priority list of recipients and/or transmission methods based on said list of recipient data for user selection; and
    generating, based on said priority list, a menu for user selection/confirmation.

16. A method according to claim 10, further comprising
    a step for interleaving the determined information content with the signal of the ongoing communication, if in said transmission method determining step is determined that the information content has to be transmitted via the communication link of an ongoing communication.

17. A method according to claim 10, wherein
    said communication system is a wireless communication system and said electronic equipment is a mobile radio terminal.

18. A method according to claim 10, wherein
    said communication system is a wireless communication system and said electronic equipment is a mobile phone.

* * * * *